United States Patent
Toyokura

(10) Patent No.: US 7,231,477 B2
(45) Date of Patent: Jun. 12, 2007

(54) BUS CONTROLLER

(75) Inventor: Masaki Toyokura, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 495 days.

(21) Appl. No.: 10/802,933

(22) Filed: Mar. 18, 2004

(65) Prior Publication Data

US 2004/0221113 A1    Nov. 4, 2004

(30) Foreign Application Priority Data

Mar. 19, 2003    (JP) ............................. 2003-076055

(51) Int. Cl.
    *G06F 13/14*    (2006.01)
(52) U.S. Cl. ...................... 710/241; 710/113
(58) Field of Classification Search ........ 710/113–125, 710/240–244
    See application file for complete search history.

(56) References Cited

U.S. PATENT DOCUMENTS

| 5,241,632 | A | * | 8/1993 | O'Connell et al. | ......... 710/117 |
| 5,533,205 | A | * | 7/1996 | Blackledge et al. | ......... 710/117 |
| 5,784,569 | A | * | 7/1998 | Miller et al. | ................. 709/235 |
| 5,956,493 | A | * | 9/1999 | Hewitt et al. | ................. 710/113 |
| 6,055,577 | A | * | 4/2000 | Lee et al. | .................... 709/233 |
| 6,058,450 | A | * | 5/2000 | LaBerge | ...................... 710/107 |
| 6,138,200 | A | * | 10/2000 | Ogilvie | ......................... 710/244 |
| 6,178,475 | B1 | * | 1/2001 | O'Brien | ...................... 710/116 |
| 6,425,032 | B1 | * | 7/2002 | Prasanna | ..................... 710/117 |
| 6,658,511 | B2 | * | 12/2003 | Yamada et al. | ............. 710/107 |
| 6,820,152 | B2 | * | 11/2004 | Kanzaki et al. | ............. 710/244 |
| 2001/0005869 | A1 | | 6/2001 | Yamada et al. | |
| 2001/0005870 | A1 | | 6/2001 | Suzuki et al. | |

FOREIGN PATENT DOCUMENTS

JP    2001-184300    7/2001

\* cited by examiner

*Primary Examiner*—Khanh Dang
(74) *Attorney, Agent, or Firm*—Wenderoth, Lind & Ponack, L.L.P.

(57) ABSTRACT

A bus controller is provided including a processing means for performing processings of levels having cycle numbers which are different dependent on requesters which respectively issue an access request to a common memory. When it is expected from the present cycle number that a limit cycle number is exceeded, the bus controller selects a processing level with which the processing is performed with a smaller cycle number, or performs a control of giving no permission to a non-realtime bus access request. Thereby, it is possible to design a system with a cycle number that is smaller than the total sum of the maximum access cycle numbers multiplied by the maximum access times over all requesters.

7 Claims, 5 Drawing Sheets the maximum number of cycles for each requester the total number of cycles of all requesters the maximum number of cycles for each requester the total number of cycles of all requesters the number of cycles for each requester the total number of cycles of all requesters

BUS CONTROLLER

FIELD OF THE INVENTION

The present invention relates to bus controllers and, more particularly, to a bus controller that controls accesses to a common memory by plural requesters in a system that processes audio-visual (AV) data and communication information.

BACKGROUND OF THE INVENTION

In AV processing systems for communicating or recording/reproducing AV data, in order to reduce the bandwidth of a communication means or the capacity of a storage medium, encoding pictures or sounds and decoding the data at the reproduction are performed. As methods for coding moving pictures as international standards, there are MPEG 1, 2, 4, and the like. These coding methods are methods comprising combinations of motion vector estimation, motion compensation, DCT (Discrete Cosine Transform), quantization, VLC (Variable Length Coding), and the like. Further, when enhancing the quality of the picture or reducing and enlarging the picture, processing such as filtering, character data processing, graphics processing, data transmission through communication lines must be carried out. In these AV processing systems, requesters perform respective processing using a common memory.

As an example of the conventional bus controller, Japanese Published Patent Application No. 2001-184300 shows a bus controller that changes priorities of arbiters (p. 5 [0026]p. 6 [0047], FIG. 1). The description of this prior art will be given with reference to FIG. 6, which is a diagram schematically illustrating the prior art. In FIG. 6, reference numeral 61 denotes a common memory, numeral 62 denotes a bus controller, numeral 63 denotes a first requester, numeral 64 denotes a second requester, and numeral 65 denotes a third requester.

A picture coding system is supposed as an example of the AV processing system. It is assumed that the first requester 63 performs filtering of pictures, the second requester 64 performs picture coding, and the third requester 65 performs data transmission via an information communication interface.

The first requester 63 and the second requester 64 perform realtime processing, and require a prescribed amount of access to a common memory or a prescribed amount of data processing in a time corresponding to a one-frame picture. On the contrary, the third requester 65 performs non-realtime processing, and performs an access to a common memory or data processing irregularly as compared to the requesters that perform the picture processing.

A structure of the bus controller 62 is shown in FIG. 5. In FIG. 5, numeral 51 denotes an arbiter, and numeral 52 denotes a protocol conversion means. When request signals from the plural requesters are inputted to the bus controller 62, the arbiter 51 supplies an enabling signal to one of the requesters in accordance with the priority. The protocol conversion means 52 has an ability of protocol converting a requester access signal (RA) indicating an address, data, and reading/writing, which is used for an access by the requester, into a common memory access signal (CMA), and a buffering ability for the protocol conversion or access speed conversion. As the common memory access signals (CMA), there are Row address and Column address outputs for accessing an SDRAM access, or a command issuance signal.

The first requester 63, the second requester 64, and the third requester 65 issue access requests for accessing the common memory 61 to the bus controller 62 in accordance with processings in the respective requesters, and access the common memory 61 through the protocol conversion by the bus controller 62 in accordance with a permission by the bus controller 62. In other words, an access of the common memory 61 is performed in accordance with the common memory access signal (CMA).

FIGS. 7(a) and 7(b) show examples of the cycle numbers. FIG. 7(a) shows the cycle numbers of the requesters. For simplicity, it is assumed that the first requester (REQ1) and the second requester (REQ2) require two accesses in a one-frame time, respectively, and the third requester (REQ3) requires zero or one access in a one-frame time, and respective requesters need an access to data that comprise a prescribed number of words. It is assumed here that the cycle number is equal to the clock number at the side of the common memory. The clock number at the side of the common memory may be changed dependent on the address which is accessed by the respective requester with respective cycle number.

In the case of SDRAM, even when data comprising the same number of words are to be accessed, in order to access the data in a minimum cycle number, address information, a command, or a sequence must be changed adaptively to the SDRAM according to whether the row address should be changed or whether the row address is a consecutive address.

As for the first requester (REQ1), the maximum cycle number is denoted by N1(max), the minimum cycle number is denoted by N1(min), and the average cycle number is denoted by N1(ave.). N1(max)–N1(ave.) is shown in black, and N1(ave.)–N1(min) is shown in white. The same applies to the second requester (REQ2).

FIG. 7(b) shows the total number of cycles in a one-frame time and designing of this cycle number. The cycle number for an access to the common memory in one frame time has a maximum value of N1(max)×2+N2(max)×2+N3(max)×1. Therefore, in order to avoid a failure of a system at the designing, it is necessary that this maximum cycle number should be ensured in one frame time. As this is the case where all accesses are made in the maximum cycle number, it is not expected that this situation occurs very frequently.

As a typical example, there are situations where the cycle number is N1(ave.)×2+N2(ave.)×2 or N1(min)+N2(max)+N1(max)+N2(min), without including the third requester (REQ3) in a one frame time. These situations are supposed to occur relatively often. Further, when all accesses are made in the minimum cycle number, only the cycle number of: N1(min)×2+N2(min)×2 is included in one frame time.

As, in the prior art, the system design is carried out in the maximum cycle number, which may not occur so frequently but has actually occurred, the cycle number per one frame time becomes large, and accordingly, the operation frequency of the common memory becomes higher, whereby the costs of the common memory and the circuit, or the difficulty in designing the system may be increased.

Further, when the cycle number in the common memory access is increased by a modification or an increase in applications after designing the system, a new bus system having a higher operation frequency is needed, thereby leading to an increase in the difficulty in designing, or increases in costs of the designing and production due to re-designing.

SUMMARY OF THE INVENTION

The present invention has for its object to provide a bus controller that can suppress an increase in the cost due to a bus system designing at higher frequencies corresponding to the maximum cycle number, which occurs less frequently, as well as, even when the maximum cycle number is increased, it is possible to design the system in the cycle number that is smaller than the maximum cycle number, i.e., at lower frequencies, thereby enabling a reduction in the re-designing of the bus system.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a bus controller that controls processing levels of plural requesters which access a common memory, including: an access cycle counter for counting the number of access cycles for which the common memory is accessed; a processing means for performing a processing of a processing level that is selected from plural processing levels that are different dependent on each requester; a correspondence information that shows correspondences between the plural processing levels of the respective requesters and the access cycle numbers; a processing level judging means for indicating a processing level of the processing performed by the processing means of the respective requesters for which an access permission is given; and the processing level judging means indicating the processing levels of the respective requesters for which an access permission is given, in accordance with a present cycle number that is counted by the access cycle counter, the number of remaining cycles up to a predetermined limit cycle number, and the correspondence information showing the correspondences between the processing levels of the respective requesters and the access cycle numbers. Therefore, when it is expected that the total number of cycles of all requesters will exceed the limit cycle number, a processing level that requires a smaller cycle number is selected, thereby enabling a bus system to be designed using the maximum access cycle number over all the requesters, and a cycle number which is smaller than a total sum of those maximum access cycle numbers corresponding to the maximum access times, thereby enabling a reduction in the designing cost and the difficulty in designing without causing a failure in the cycle.

According to a 2nd aspect of the present invention, there is provided a bus controller that arbitrates plural access requests which are issued from plural requesters that would access a common memory, including: an access cycle counter for counting the number of access cycles for which the common memory is accessed; a correspondence information that shows correspondences between the plural processing levels of the respective requesters and the access cycle numbers; an arbiter that arbitrates the plural access requests which are issued from the plural requesters; and the arbiter performing a control for giving no permission to a non-realtime bus access request when it is expected that a total number of cycles of all the requesters would exceed the limit cycle number in accordance with a present cycle number that is counted by the access cycle counter, the number of remaining cycles up to a predetermined limit cycle number, and the correspondence information that shows correspondences between the plural requesters and the access cycle numbers. Therefore, it is possible to design a bus system using the maximum access cycle numbers of all the requesters and a cycle number that is smaller than a total sum of those maximum access cycle numbers corresponding to the maximum access times, whereby the designing cost and the difficulty in designing can be reduced without causing a failure in the cycle.

According to a 3rd aspect of the present invention, there is provided a bus controller that controls processing levels of plural requesters which access a common memory, and arbitrates plural access requests that are issued from the plural requesters, including: an access cycle counter for counting the number of access cycles for which the common memory is accessed; a processing means for performing a processing of a processing level that is selected from plural processing levels which are different dependent on each requester; a correspondence information that shows correspondences between the plural processing levels of the respective requesters and the access cycle numbers; a processing level judging means for indicating a processing level of the processing performed by the processing means of the respective requesters for which an access permission is given; an arbiter for arbitrating the plural access requests which are issued from the plural requesters which would access the common memory, and the processing level judging means and the arbiter indicating the levels of the processings which are performed by the processing means of the respective requesters for which an access permission is given, in accordance with a present cycle number counted by the access cycle counter, the number of remaining cycles up to a predetermined limit cycle number, and the correspondence information, and performing a control for giving no permission to a non-realtime bus access request when it is expected that a total number of cycles of all requesters would exceed the limit cycle number. Therefore, it is possible to design a bus system using the maximum access cycle number of all the requesters and a cycle number that is smaller than a total sum of those maximum access cycle numbers corresponding to the maximum access times, whereby the designing cost and the difficulty in designing can be reduced without causing a failure in the cycle.

According to a 4th aspect of the present invention, the bus controller of the 1st aspect includes the processing level judging means calculating a total sum of the numbers of access cycles when performing processings from a processing of a requester, which is two processings after a present one, to the last processing in a reference time, at levels for which the respective maximum cycle numbers are the smallest, obtaining the number of remaining cycles by subtracting a present access cycle number from the limit cycle number, and selecting a processing level of a next processing of a requester within a range of the cycle number that is obtained by subtracting the total sum from the number of the remaining cycles. Therefore, it is possible to design a bus system using the maximum number of access cycles of all the requesters and a cycle number that is smaller than a total sum of those maximum access cycle numbers corresponding to the maximum access times, whereby the designing cost and the difficulty in designing can be reduced without causing a failure in cycles, and further it is possible to perform an optimum processing during almost all periods.

According to a 5th aspect of the present invention, the bus controller of the 2nd aspect includes: the arbiter calculating a total sum of the numbers of access cycles when performing processings from a next processing of a non-realtime requester as a next requester to the last processing in a reference time, at levels for which the respective maximum cycle numbers are the smallest, obtaining the number of remaining cycles by subtracting a present access cycle number from the limit cycle number, and performing a control for giving no permission to the non-realtime requester when the processings cannot be completed within a range of the cycle number that is obtained by subtracting the total sum from the number of remaining cycles. Therefore, it is possible to design a bus system using the maximum number of access cycles of all the requesters and a cycle number that is smaller than a total sum of those maximum access cycle numbers corresponding to the maximum access times, whereby the designing cost and the difficulty in designing can be reduced without causing a failure in the cycle, and further it is possible to perform an optimum processing during almost all the periods.

According to a 6th aspect of the present invention, the bus controller of the 3rd aspect includes the processing level judging means and the arbiter calculating a total sum of the numbers of access cycles when performing processings from a next processing of a non-realtime requester as a next requester to the last processing in a reference time, at levels for which the respective maximum cycle numbers are the smallest, obtaining the number of remaining cycles by subtracting a present access cycle number from the limit cycle number, and performing a control for giving no permission to the non-realtime requester when the processings cannot be completed within a range of the cycle number that is obtained by subtracting the total sum from the number of remaining cycles. Therefore, it is possible to design a bus system using the maximum number of access cycles of all the requesters and a cycle number that is smaller than a total sum of those maximum access cycle numbers corresponding to the maximum access times, whereby the designing cost and the difficulty in designing can be reduced without causing a failure in the cycle, and further it is possible to perform an optimum processing during almost all the periods.

According to a 7th aspect of the present invention, in the bus controller of the 6th aspect, the non-realtime requester has plural different processing levels. Therefore, it is possible to design a bus system using the maximum number of access cycles of all the requesters and a cycle number that is smaller than a total sum of those maximum access cycle numbers corresponding to the maximum access times, whereby the designing cost and the difficulty in designing can be reduced without causing a failure in the cycle, and further it is possible to perform an optimum processing during almost all the periods.

DETAILED DESCRIPTION OF THE PREFERRED EMBODIMENTS

Embodiment 1

A first embodiment of the present invention will be described.

Figure 1:
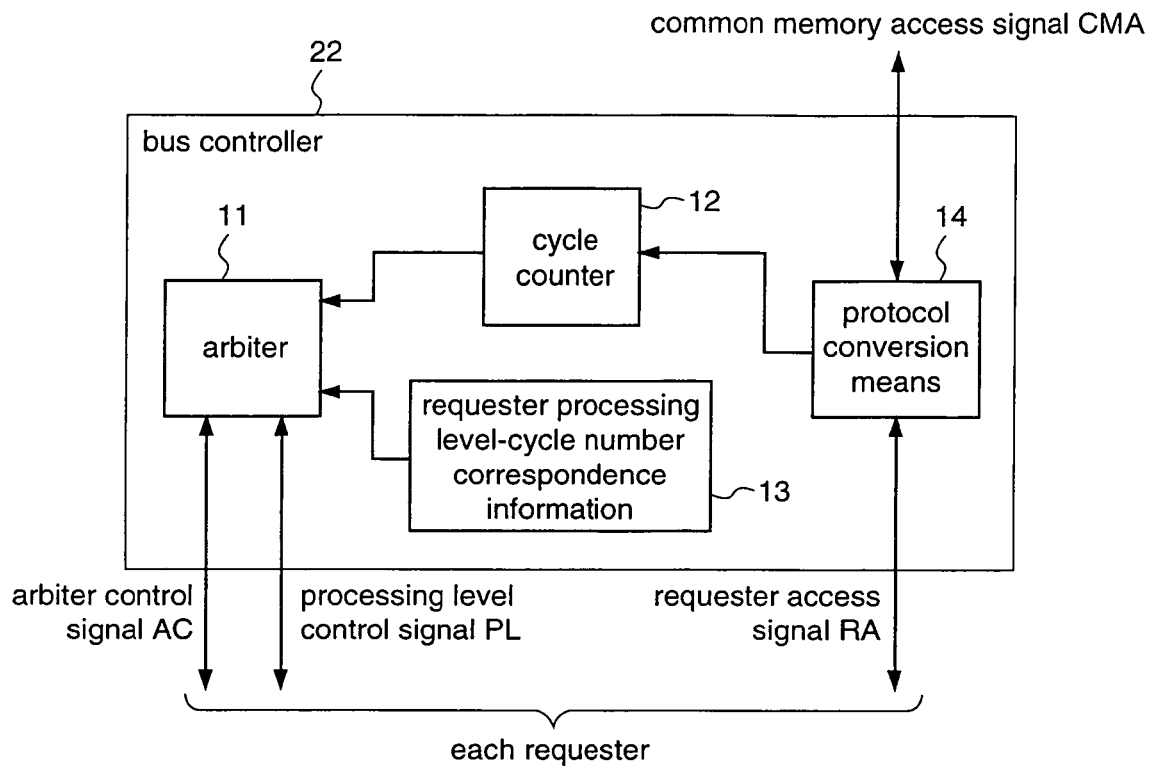
FIG. 1 is a block diagram illustrating a bus controller according to a first embodiment of the present invention.
Figure 2:
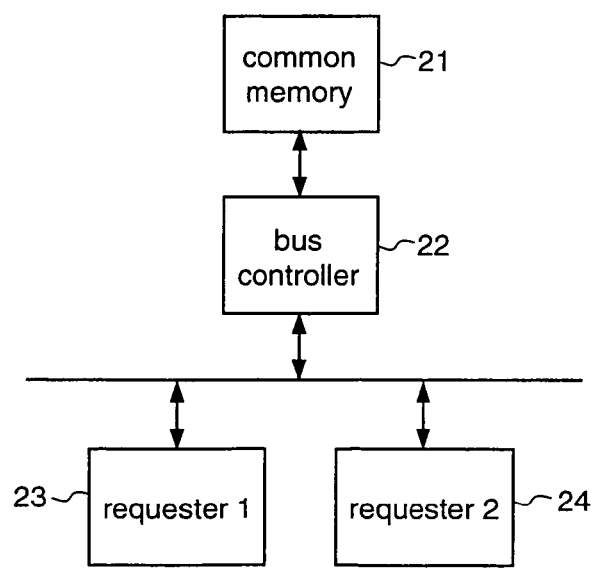
FIG. 2 is a diagram illustrating an example of a structure of a bus system according to the first embodiment.
Figure 3:
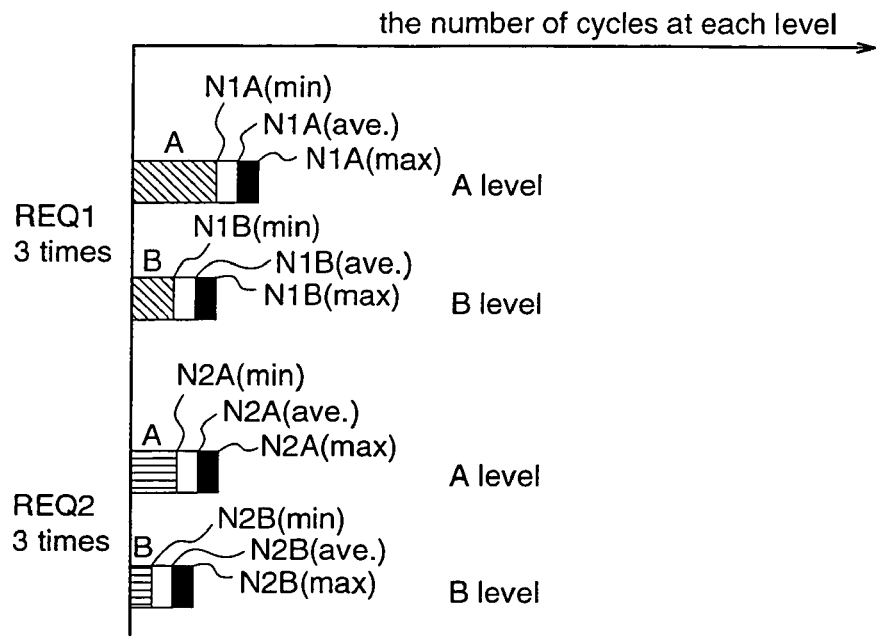
FIG. 3(a) is a diagram showing an example of the cycle number for each requester in a processing cycle according to the first embodiment.
FIG. 3(b) is a diagram showing the total number of cycles in one frame time and cycle number designing in the processing cycle according to the first embodiment.
Figure 3:
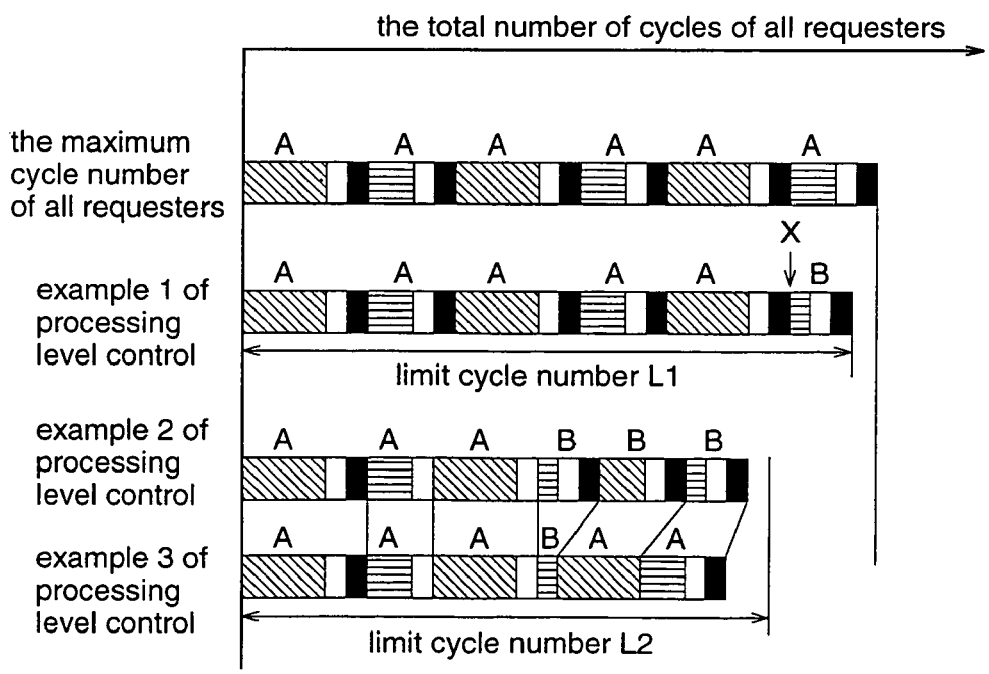

FIG. 1 is a block diagram illustrating a bus controller according to the first embodiment. FIG. 2 is a diagram illustrating a structure of a bus system according to the first embodiment. FIG. 3 is a diagram showing an example of a processing cycle according to the first embodiment.

In FIG. 2, reference numeral 21 denotes a common memory, numeral 22 denotes a bus controller, numeral 23 denotes a first requester, and numeral 24 denotes a second requester.

A picture coding system is taken here as an example of the AV processing system. It is assumed that the first requester 23 performs filtering of pictures, and the second requester 24 performs coding of pictures. The first requester 23 and the second requester 24 perform realtime processing. Each of the requesters has two levels of processing in a time corresponding to one frame picture (hereinafter, referred to as one-frame time), and needs a prescribed amount of access to the common memory and a prescribed amount of data processing in accordance with the respective processing level.

It is assumed here that one of the two processing levels at which the cycle number of accesses to the common memory is larger is referred to as level A, and a level at which the cycle number of accesses to the common memory is smaller is referred to as level B. The first requester 23 performs the filtering of pictures using data of a present frame and a preceding frame as that at level A, and performs the filtering using data of the present frame as that at level B. The second requester 24 performs the coding of pictures using a reference picture with respect to a wider motion vector estimation range as that at level A, and performs the picture coding using a reference picture with respect to a narrower motion vector estimation range as that at level B. In both requesters, at the level A, the quality of the picture is higher while the cycle number of memory access is larger.

A structure of the bus controller 22 is shown in FIG. 1. In FIG. 1, numeral 11 denotes an arbiter, numeral 12 denotes a cycle counter, numeral 13 denotes information showing correspondences between the requester processing level and the memory cycle (hereinafter, referred to as a requester processing level-cycle number correspondence information), and numeral 14 denotes a protocol conversion means. When access request signals from the respective requesters are inputted to the bus controller 22, the arbiter 11 supplies an enabling signal and a processing level control signal to one of the requesters in accordance with the priority. Here, the access requests are inputted to the bus controller 22 from the first requester 23 and then from the second requester 24 repeatedly in turn, and the arbiter 11 gives permission to these access requests in this order.

The cycle counter 12 counts the cycle number of accesses to the common memory 12 in accordance with information from the protocol conversion means 14, and outputs the cycle number at that time to the arbiter 11 at each access. The arbiter 11 obtains the number of remaining cycles from the present cycle number and a predetermined limit cycle number, then decides the next requester which is to be given permission for access to the common memory 21, using information in the requester processing level-cycle number correspondence information 13, and outputs an arbiter control signal (arbitration signal) AC as well as decides a processing level of the requester which is given permission for access, and outputs a processing level control signal PL.

The protocol conversion means 14 protocol-converts a requester access signal RA indicating an address, data, and reading/writing, which is used for accesses by the requesters, into a common memory access signal CMA, and also has a buffering ability for the protocol conversion and access speed conversion. As the common memory access signal CMA, there are Row address and Column address for accessing SDRAM, a command issuance signal, and the like.

The first requester 23 and the second requester 24 each outputs a request to access the common memory 21 to the bus controller 22 in accordance with the processing in each requester, and accesses the common memory 21 through protocol conversion of the bus controller 22 in accordance with a permission of the bus controller 22 and the processing level control signal.

The operation is described in more detail with reference to an example of the cycle number shown in FIGS. 3($a$) and 3($b$). FIG. 3($a$) shows an example of the cycle number for each requester. For simplicity, it is assumed here that the first requester (REQ1) and the second requester (REQ2) require three accesses in a time corresponding to one frame, respectively, and each requester needs an access to data comprising a prescribed number of words. It is assumed that the cycle number is equal to the clock number at the side of the common memory. The clock number at the side of the common memory may be changed in accordance with an address which is accessed in the cycle number of each requester. In the case of SDRAM, even when data comprising the same number of words are accessed, in order to access the data in the minimum cycle number, address information, a command, or a sequence must be changed adaptively to the SDRAM according to whether the row address should be changed or the row address is a consecutive address. In this figure, the maximum cycle number in the level A processing of the first requester (REQ1) is denoted by N1A(max), the minimum cycle number in the level A processing is denoted by N1A(min), and the average cycle number is denoted by N1A(ave.). Further, the maximum cycle number in the level B processing is denoted by N1B(max), the minimum cycle number is denoted by N1B(min), and the average cycle number is denoted by N1B(ave.). N1A(max)–N1A(ave.) and N1B(max)–N1B(ave.) are shown in black, and N1A(ave.)–N1A(min) and N1B(ave.)–N1B(min) are shown in white. The same applies to the second requester (REQ2).

FIG. 3($b$) shows the total number of cycles in one frame time, and designing of the cycle number. The cycle number for the common memory access in one frame time has a maximum value in the case of N1A(max)×3+N2A(max)×3. When the limit cycle number in the designing is set as shown in the figure, the control for preventing a system failure is performed by indicating respective processing levels to the requesters.

In Example 1 of the processing level control shown in FIG. 3($b$), the limit cycle number L1 is set at a value which is N2A(max)–N2B(max) cycles less than the maximum cycle number (N1A(max)×3+N2A(max)×3), i.e., N1A (max)×3+N2A(max)×3–(N2A(max)–N2B(max))=N1A (max)×3+N2A(max)×2+N2B(max) cycles. This corresponds to a case where the processing level is judged in a timing before starting the last access, indicated by an arrow X. When the number of remaining cycles is equal to or larger than the maximum cycle number (N1A(max)) in the level A processing, the level A processing is selected, while when the number of remaining cycles is smaller than the maximum cycle number (N1A(max)) in the level A processing, the level B processing is selected. Thus, when the number of completed cycles has the maximum value of N1A(max)× 3+N2A(max)×2 before starting the last access, the level B processing would be selected at the last processing, and even when this level B processing is performed in the maximum number of processing cycles, the total number of cycles becomes N1A(max)×3+N2A(max)×2+N2B(max), which would not exceed the limit cycle number L1, thereby preventing occurrence of the system failure.

Hereinafter, the method for judging the processing level according to the first embodiment will be generalized. The processings that are required in a unit time will be represented by symbols, i.e., q(n) level processing in the n-th processing (n=1, 2, . . . , N) is represented by pr(n, q(n)), and the cycle number at that time is represented by C(pr(n, q(n)). In this case, $q(n)_{min}$ represents a level for which the maximum access cycle number is the smallest. It is assumed here that the maximum value of the cycle number C(pr(n, q(n)) is $C(pr(n, q(n)))_{max}$. Further, it is assumed that the number of remaining cycles immediately before performing the n-th processing is R(n).

At judging the processing level, when the number of remaining cycles R(n0) immediately before the n0-th processing pr(n0, q(n)) is equal to or larger than the total number of access cycles ($\Sigma_{n=n0}^{N} C(pr(n, q_{min}))_{max}$ in a case of performing all of the remaining necessary processings at the lowest level (i.e., processing level q(n)min at which the maximum cycle number is the smallest), it is possible to avoid the system failure by selecting this lowest level $q_{min}$. Further, even in a case where an access following the n0-th processing is carried out in the maximum cycle number $C(pr(n0, q)_{max}$ at level q, when the number of remaining cycles: $R(n0+1)=R(n0)-C(pr(n0, q)_{max}$ is equal to or larger than the total number of access cycles ($\Sigma_{n=n0+1}^{N} C(pr(n, q_{min}))_{max}$) that is required at a time of performing all of the remaining necessary processings at the lowest level (processing level at which the maximum access cycle number is the smallest), it is possible to prevent the system failure by selecting this lowest level. As a processing level q, which satisfies these requirements can be selected.

That is, it is possible to select a processing level q that holds a relationship: $R(n0)-C(pr(n0, q(n0)))_{max} \geq \Sigma_{n=n0+1}^{N} C(pr(n, q(n)_{min}))_{max}$.

When, in the initial state, R(1)=L (limit cycle number) and $R(1)-C(pr(1, q(1)))_{max} \geq \Sigma_{n=2}^{N} C(pr(n, q(n)_{min}))_{max}$, and further there exists a processing level at which the system does not fail, it is necessary that the following relationship holds: $R(1)=L \geq C(pr(1, q(1)))_{max} + \Sigma_{n=2}^{N} C(pr(n, q(n)_{min}))_{max} \geq C(pr(1, q(1)_{min}))_{max} + \Sigma_{n=2}^{N} C(pr(n, q(n)_{min}))_{max} = \Sigma_{n=1}^{N} C(pr(n, q(n)_{min}))_{max}$, that is, $L \geq \Sigma_{n=1}^{N} C(pr(n, q(n)_{min}))_{max}$. An example of a limit cycle number L2 in FIG. 3($b$) will be described.

In the case where $R(n0)-C(pr(n0, q(n0)))_{max} \geq \Sigma_{n=n0+1}^{N} C(pr(n, q(n)_{min}))_{max}$, it is possible to select the level A as for q(n0) when n0=1, 2, and 3. However, when n0=4, as for q(4) that holds the relationship: $R(4)-C(pr(4, q(4)))_{max} \geq \Sigma_{n=5}^{6} C(pr(n, q(n)_{min}))_{max}$, it is possible to select only the level B. In the case where the level A is indicated at the 4th access (n0=4), when the cycle number has the maximum value at the level A, the system would fail when the 5th and 6th accesses are performed in the maximum cycle number even when the level B is indicated. This is why the level B is indicated for the 4th access. The same applies to the 5th and the 6th accesses.

As described above, the bus controller according to the first embodiment includes the access cycle counter 12, the arbiter 11 as a processing means for performing processing of different levels that varies with requesters, and the correspondence information 13 that shows correspondences between the processing level that varies with requesters and the number of access cycles. Further, the arbiter 11 arbitrates access permission for access requests from plural requesters, and also functions as a processing level judging means that indicates the processing level. Therefore, it is possible that the arbiter 11 decides a requester which is given permission for accessing the common memory 21 on the basis of the present cycle number, the number of remaining cycles up to the predetermined limit cycle number, and the correspondence information, and indicates the processing level of the requester that is given permission for accessing, and, when it is expected that the limit cycle number is exceeded in indicating the processing level, the arbiter selects a processing level that requires a smaller cycle number. Accordingly, it is possible to design a bus system in the cycle number, which is smaller than the total sum of all requesters, i.e., the maximum number of access cycles×the maximum number of times of access. For example, the total sum of the number of access cycles at a time of performing processings of from an access of a requester that is two requesters after the present requester, i.e., from an access of a requester following a requester which is subsequent to the requester that has completed the present access up to the last processing in a reference time, at levels at which the maximum cycle number has the smallest value is calculated, then the number of remaining cycles is obtained by subtracting the present access cycle number from the limit cycle number, and the processing level of the subsequent requester is selected within a range up to the cycle number that is obtained by subtracting the total sum from the number of remaining cycles, thereby realizing an appropriate design.

Therefore, it is possible to reduce an increase in the cost due to the bus system designing at higher frequencies, and further even when the maximum cycle number is increased, it is possible to achieve designing of the bus controller in the cycle number that is smaller than the maximum cycle number, i.e., at lower frequencies, thereby suppressing re-designing.

Embodiment 2

A second embodiment of the present invention will be described.

Figure 6:
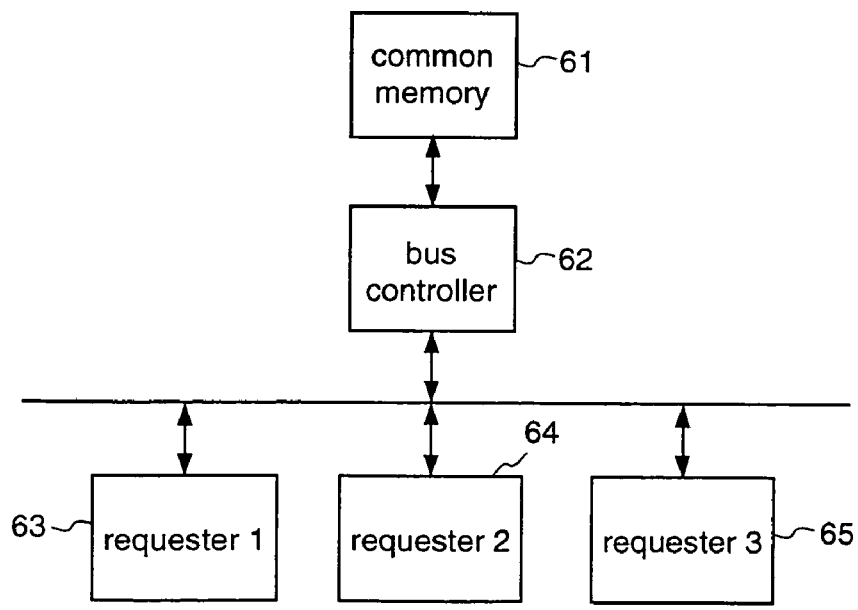
FIG. 6 is a diagram illustrating an example of a structure of a conventional bus system.
Figure 7:
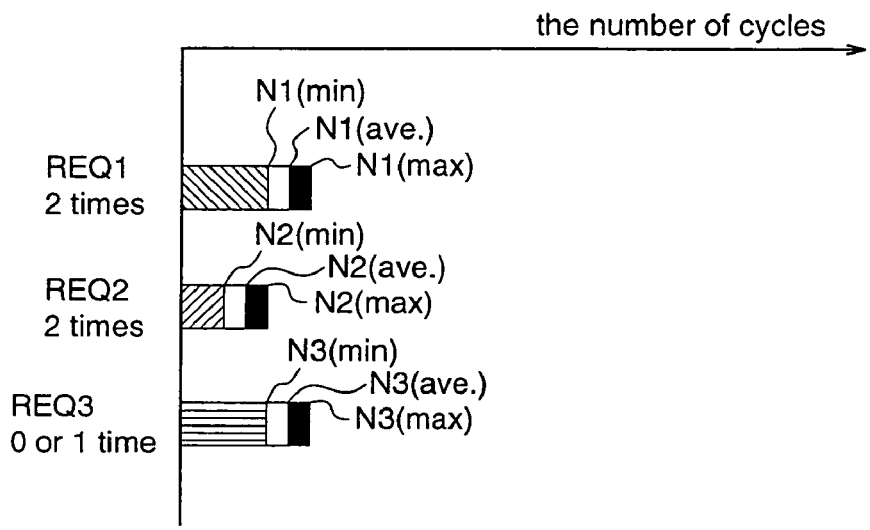
FIG. 7(a) is a diagram showing the cycle number for each requester in a conventional processing cycle.
FIG. 7(b) is a diagram showing the total number of cycles in one frame time and cycle number designing in the conventional processing cycle.
Figure 7:
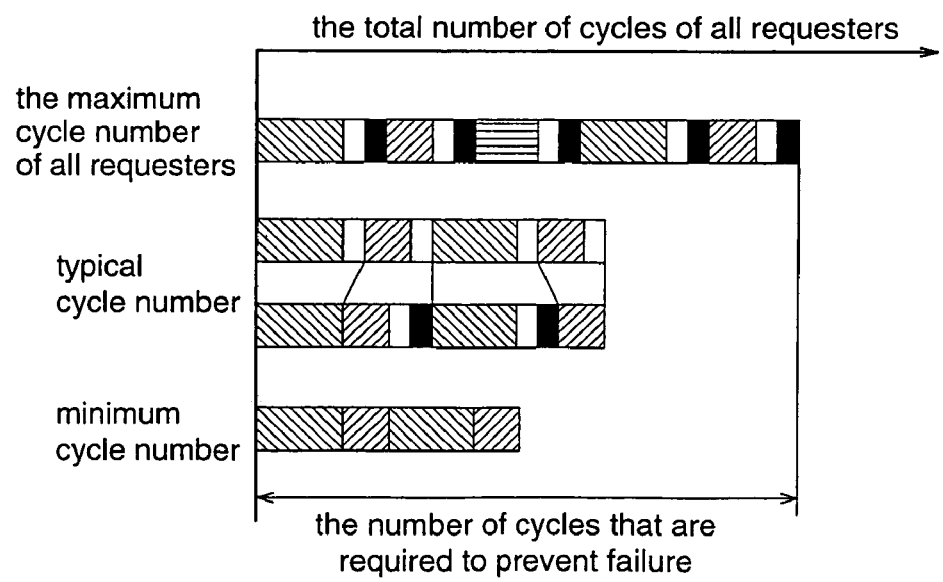

The second embodiment is described with reference to the example of the bus system shown in FIG. 6 like the prior art.

The first requester 63 and the second requester 64 perform realtime processing. Each requester has two processing levels in a time corresponding to one frame picture, and requires a prescribed amount of access to a common memory and a prescribed amount of data processing in accordance with the respective processing level. One of the two processing levels at which the cycle number of accesses to the common memory is larger is referred to as that of level A, and a processing level at which the number of access cycles is smaller is referred to as level B. It is assumed that the first requester 63 performs filtering of pictures using data of a present frame and a preceding frame as that of level A, and performs the filtering using the data of a present frame as that of level B. It is further assumed that the second requester 64 performs coding of pictures using a reference picture for a wider motion vector estimation range as that of level A, and performs the picture coding using a reference picture for a narrower motion vector estimation range as that of level B. In the level A of the both requesters, the quality of a picture is higher while the number of memory cycles is larger. The third requester 65 performs non-realtime processing, and makes accesses to the common memory and performs data processing, which are irregular with relative to the processing of pictures.

The structure of the bus controller 62 is the same as that shown in FIG. 1.

The cycle counter 12 counts the cycle number of accesses to the common memory in accordance with the information from the protocol conversion means 14, and outputs the cycle number for each access at that time.

The arbiter 11 calculates the number of remaining cycles from the present cycle number and a predetermined limit cycle number, and supplies an enabling signal and a processing level control signal to one of the requesters in accordance with their priorities using the requester processing level-cycle number correspondence information 13. The arbiter 11 alternately gives permission for access requests that are inputted from the first requester 63 and then from the second requester 64 repeatedly in turn, and the arbiter 11 inserts permission for an irregular access request from the third request 65 in accordance with the number of remaining cycles and the requester processing level-cycle number correspondence information.

The protocol conversion means 14 protocol-converts a requester access signal indicating an address, data, and reading/writing, which is used for accesses by the requesters, into a common memory access signal, as well as has a buffering ability for the protocol conversion and access speed conversion. As the common memory access signal, there are Row and Column addresses accessing for SDRAM, a command issuance signal, and the like.

The first requester 63, the second requester 64, and the third requester 65 issue requests for accessing the common memory 61 to the bus controller 62 in accordance with the respective processing of the requesters, and accesses the common memory 61 through the protocol conversion of the bus controller 62 in accordance with a permission of the bus controller 62 and the processing level control signal.

Figure 4:
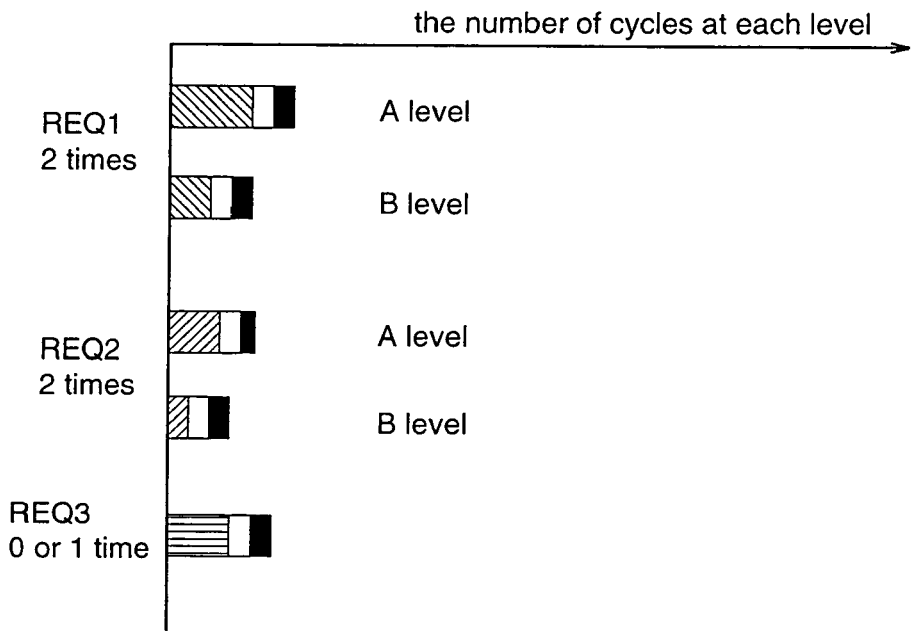
FIG. 4(a) is a diagram showing an example of the cycle number for each requester in a processing cycle according to a second embodiment.
FIG. 4(b) is a diagram showing the total number of cycles in one frame time and cycle number designing in the processing cycle according to the second embodiment.
Figure 4:
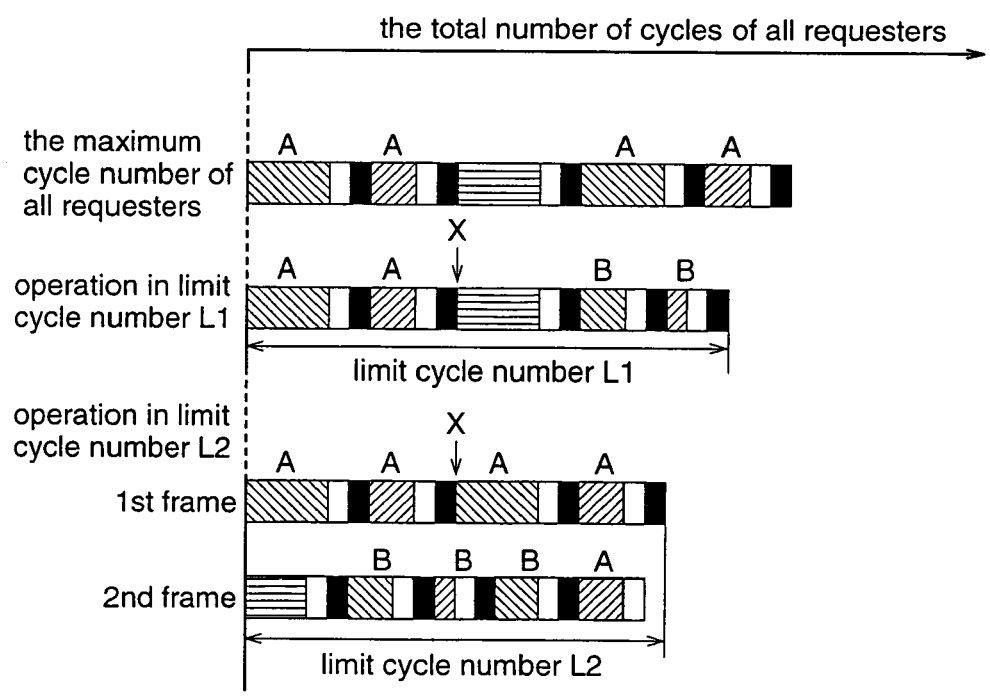
Figure 5:
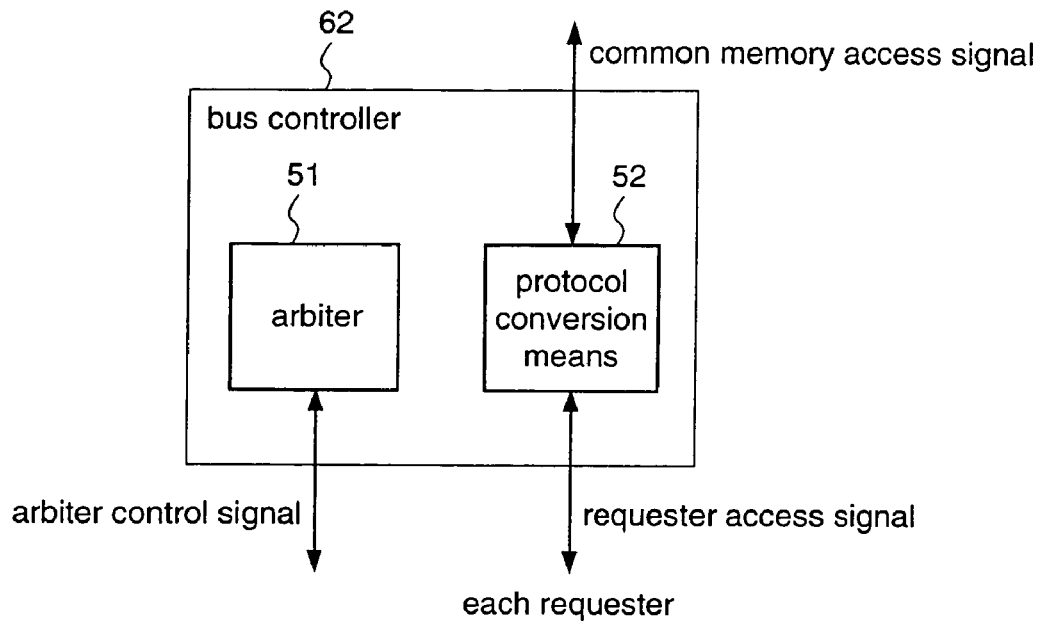
FIG. 5 is a block diagram illustrating a conventional bus controller.

The operation will be described in detail with reference to an example of the cycle number as shown in FIGS. 4(a) and 4(b). An example of the cycle number for each requester is shown in FIG. 4(a). For simplicity, it is assumed that the first requester (REQ1) and the second requester (REQ2) require two accesses in one frame time, respectively, and the third requester (REQ3) requires zero or one access in one frame time. Each requester needs access to data that comprise a prescribed number of words. It is assumed that the cycle number is equal to the clock number at the side of the common memory. The clock number at the side of the common memory may vary according to addresses that are accessed in the cycle number of the respective requesters. In the case of SDRAM, even when data comprising the same number of words are accessed, in order to access the data in the smallest cycle number, the address information, command, or sequence must be changed adaptively to the SDRAM according to whether the Row address should be changed or the Row address is a consecutive address. In this figure, the maximum cycle number in the processing of level A by the first requester (REQ1) is denoted by N1A(max), the minimum cycle number is denoted by N1A(min), and the average cycle number is denoted by N1A(ave.). Further, the maximum cycle number in the processing of level B is denoted by N1B(max), the minimum cycle number is denoted by N1B(min), and the average cycle number is denoted by N1B(ave.). N1A(max)–N1A(ave.) and N1B (max)–N1B(ave.) are shown in black, and N1A(ave.)–N1A (min) and N1B(ave.)–N1B(min) are shown in white. The same applied to the second requester (REQ2). The third requester (REQ3) has one processing level. The maximum cycle number in the third requester is denoted by N3(max), the minimum cycle number is denoted by N3(min), and the average cycle number is denoted by N3(ave.). N3(max)–N3 (ave.) is shown in black, and N3(ave.)–N3(min) is shown in white.

FIG. 4(b) shows the total number of cycles in one frame time, and designing of the cycle number. The cycle number of accesses to the common memory in one frame time has the maximum value of N1A(max)×2+N2A(max)×2+N3 (max). When the limit cycle number at the designing is set as shown in this figure, the control is performed in such a manner that respective processing levels are indicated to the requesters so that the cycle number will not exceed the limit cycle number at the completion of the last accessing, thereby avoiding the system failure.

In an example of the operation in the limit cycle number L1 as shown in FIG. 4(b), it is assumed that the limit cycle number L1 has the maximum value: N1A(max)+N2A (max)+N3(max)+N1B(max)+N2B(max). An operation is given of consideration in which the processing level is judged when a request is issued from the third requester before a timing indicated by an arrow X after the second access being performed.

When the number of remaining cycles is equal to or larger than (N3(max)+N1B(max)+N2B(max)) cycles, the third requester is given permission for accessing. In this example, when the third access is performed by the third requester in the maximum cycle number, it is possible to complete the access without causing a system failure, by performing one access of the first requester and one access of the second requester, which are remaining accesses in one frame time, at the level B.

In an example of the operation in the limit cycle number L2 as shown in FIG. 4(b), it is assumed that the limit cycle number L2 is smaller than the maximum cycle number: (N1A(max)+N2A(max)+N3(max)+N1B(max)+N2B(max)) cycles. An operation is given of consideration in which the processing level is judged when an access request is issued from the third requester before the timing indicated by the arrow X after the second access being performed.

When the number of remaining cycles is equal to or larger than (N3(max)+N1B(max)+N2B(max)) cycles, the third requester is given access permission. In this example, however, when the access of the third requester is given permission, even if one access of the first requester and one access of the second requester, which are remaining accesses in one frame time, are performed at the level B, the system would fail when these accesses are performed in the maximum cycle number. Therefore, in order to avoid the system failure, the access request from the third requester is given no permission. Instead, by giving permission for an access to the third requester at the head of the second frame, it is possible to effectively reduce the cycle number in which the third requester should wait.

Here, the way to judge the processing level is generalized. Processings that are required to be performed in a unit time are represented by symbols like in the first embodiment, and non-realtime processing is denoted by S. Even when the maximum cycle number C(S)max in this processing has been completed, when the number of remaining cycles $R(n0)-C(S)_{max}$ is equal to or larger than the total number of access cycles $(\Sigma_{n=n0}^{N} C(pr(n, q_{min}))_{max})$ which are required at performing all remaining necessary processings after the next access at the lowest level (the processing level for which the maximum access cycle number is the smallest), it is possible to prevent the system failure by selecting this lowest level.

Therefore, permission can be given to the processing S. That is, the processing S that holds a relationship: $R(n0)-C(S)_{max} \geq \Sigma_{n=0}^{N} C(pr(n, q(n)_{min}))_{max}$ is permitted.

When it is possible to set the processing level for the non-realtime processing like the realtime processing, the non-realtime processing S(q) at level q, which holds a relationship: $R(n0)-C(S(q))_{max} \geq \Sigma_{n=0}^{N} C(pr(n, q(n)_{min}))_{max}$ can be permitted.

As described above, the bus controller according to the second embodiment includes the access cycle counter 12, the arbiter 11 as a processing means for performing a processing of a level that is selected from plural levels which are different dependent on each requester, and a correspondence information 13 that shows correspondences between the processing level that varies with the respective requesters and the number of access cycles. In addition, the arbiter 11 arbitrates permission for access requests from plural requesters, and also functions as a processing level judging means for indicating the processing level. Therefore, when it is expected from the present cycle number, the number of remaining cycles up to a predetermined limit cycle number and the correspondence information, that the limit cycle number is exceeded, the arbiter 11 performs a control for not giving permission to a non-realtime bus access request. Thereby, it is possible to design a bus system in the cycle number, which is smaller than a total sum that is obtained by the maximum number of access cycles×the maximum number of accesses for all requesters. For example, the total sum of the numbers of access cycles which are required when performing processings from a processing that is subsequent to a processing performed by the non-realtime requester as the next requester, up to the last processing in a reference time at a processing level at which the maximum cycle number is the smallest is calculated, and the number of remaining cycles is obtained by subtracting the present access cycle number from the limit cycle number, and when these processings cannot be completed within a range of the cycle number, which is obtained by subtracting the total sum from the number of remaining cycles, the non-realtime requester is given no permission. Accordingly, it is possible to design the bus system in the total number of processing cycles, which does not include the number of non-realtime processing cycles.

Therefore, it is possible to reduce an increase in the cost due to bus system designing at higher frequencies, and even when the maximum cycle number is increased, it is possible to achieve designing of the bus controller in the cycle number that is smaller than the maximum cycle number, i.e., at lower frequencies, thereby suppressing re-designing.

What is claimed is:

1. A bus controller for controlling processing levels of plural requesters which access a common memory, the bus controller including:
an access cycle counter for counting the number of access cycles for which the common memory is accessed;
an arbiter coupled to the access cycle counter for judging a processing level of a processing of a requester, from plural processing levels that are different dependent on each requester, for which an access permission is given, and for performing the processing of the processing level that is judged previously;
a correspondence information unit coupled to the arbiter for storing correspondence information that shows correspondences between the plural processing levels of the respective requesters and the access cycle numbers,
wherein the arbiter is operable to judge the processing levels of the respective requesters for which an access permission is given, in accordance with a present cycle number that is counted by the access cycle counter, the number of remaining cycles up to a predetermined limit cycle number, and the correspondence information showing the correspondences between the processing levels of the respective requesters and the access cycle numbers.

2. A bus controller for arbitrating plural access requests which are issued from plural requesters to access a common memory, the bus controller including:
an access cycle counter for counting the number of access cycles for which the common memory is accessed;
a correspondence information unit for storing correspondence information that shows correspondences between the plural processing levels of the respective requesters and the access cycle numbers; and
an arbiter coupled to the access cycle counter and the correspondence information unit for arbitrating the plural access requests which are issued from the plural requesters,
wherein said arbiter is operable to perform a control for giving no permission to a non-realtime bus access request when it is expected that a total number of cycles of all the requesters would exceed a limit cycle number in accordance with a present cycle number that is counted by the access cycle counter, the number of remaining cycles up to a predetermined limit cycle number, and the correspondence information that shows correspondences between the plural requesters and the access cycle numbers.

3. A bus controller for controlling processing levels of plural requesters which access a common memory, and for arbitrating plural access requests that are issued from the plural requesters, the bus controller including:
an access cycle counter for counting the number of access cycles for which the common memory is accessed;
an arbiter coupled to the access cycle counter for judging a processing level of a processing requester, from plural processing levels that are different dependent on each requester, for which an access permission is given for performing the processing of the processing level that is judged previously, and for arbitrating the plural access requests which are issued from the plural requesters to access the common memory; and
a correspondence information unit coupled to the arbiter for storing correspondence information that shows correspondences between the plural processing levels of the respective requesters and the access cycle numbers,
wherein the arbiter is operable to judge the processing levels of the respective requesters for which an access permission is given, in accordance with a present cycle number counted by the access cycle counter, and the number of remaining cycles up to a predetermined limit cycle number.

4. The bus controller of claim 1,
wherein the arbiter is operable to calculate a total sum of the numbers of access cycles when performing processings from a processing of a requester, which is two processings after a present one, to the last processing in a reference time, at levels for which the respective maximum cycle numbers are the smallest,
wherein the arbiter is operable to obtain the number of remaining cycles by subtracting a present access cycle number from the limit cycle number, and
wherein the arbiter is operable to select a processing level of a next processing of a requester within a range of the cycle number that is obtained by subtracting the total sum from the number of the remaining cycles.

5. The bus controller of claim 2,
wherein the arbiter is operable to calculate a total sum of the numbers of access cycles when performing processings from a next requester to the last processing in a reference time, at levels for which the respective maximum cycle numbers are the smallest,
wherein the arbiter is operable to obtain the number of remaining cycles by subtracting a present access cycle number from the limit cycle number, and
wherein the arbiter is operable to perform a control for giving no permission to the non-realtime requester when the processings cannot be completed within a range of the cycle number that is obtained by subtracting the total sum from the number of remaining cycles.

6. The bus controller of claim 3,
wherein the arbiter is operable to calculate a total sum of the numbers of access cycles when performing processings from a next processing of a non-realtime requester as a next requester to the last processing in a reference time, at levels for which the respective maximum cycle numbers are the smallest,
wherein the arbiter is operable to obtain the number of remaining cycles by subtracting a present access cycle number from the limit cycle number, and
wherein the arbiter is operable to perform a control for giving no permission to the non-realtime requester when the processings cannot be completed within a range of the cycle number that is obtained by subtracting the total sum from the number of remaining cycles.

7. The bus controller of claim 6, wherein
the non-realtime requester has plural different processing levels.

* * * * *